Patented Feb. 17, 1931

1,793,028

UNITED STATES PATENT OFFICE

SAMUEL LEWIS SUMMERS, OF FORT WASHINGTON, PENNSYLVANIA

METHYLENE-DIGUAIACOL DERIVATIVE

No Drawing.   Application filed December 8, 1928.   Serial No. 324,803.

My invention relates to organic compounds and their manufacture and is especially concerned with novel iodine derivatives of the condensation products of terpin hydrate with the di(aminobenzyl) derivatives of methylene-diguaiacol. These substances are useful for pharmaceutical purposes as hereinafter indicated.

My products may be prepared as follows, one method for carrying out each step being given without limiting myself to the exact methods given:

The first main step is to introduce two nitrobenzyl groups into methylene-diguaiacol. A satisfactory way of doing this is to heat a mixture of 256 parts of methylene-diguaiacol, 90 parts of sodium hydroxide, and 344 parts of nitrobenzyl chloride to 130° C. for 24 hours. Any one of the three isomeric nitrobenzyl chlorides, the ortho, meta or para, may be used, with corresponding slight differences in the products. The product is washed free of inorganic salts and is then essentially a di(nitrobenzyl) derivative of methlene-diguaiacol in which the two nitrobenzyl groups enter the two guaiacol residues ortho to the hydroxyl groups:

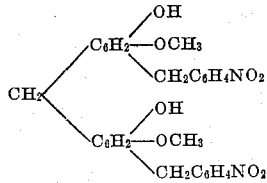

The second main step is the reduction of this to the corresponding di(aminobenzyl) ether-like derivatives. This may be done by mixing 530 parts of the above dinitro compound with 400 parts of free metallic zinc in the form of dust and 1800 parts of hydrochloric acid. When the heat of the spontaneous chemical reaction has subsided, the mass is heated to 100° C. and kept at that temperature for 4 hours. The product of the reaction is freed from excess acid, zinc salts, and other impurities. It is essentially one of the di(aminobenzyl) derivatives of methylene-diguaiacol:

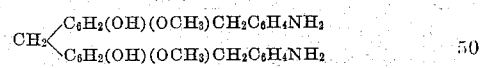

This is insoluble in cold water but is soluble in alcohol.

The third main step is to condense this product with terpin hydrate. One way of accomplishing this is to heat 468 parts of the above described diamino compound with 380 parts of terpin hydrate and 400 parts of zinc chloride to 110° C. for 8 hours. The resulting mass is washed with cold water to remove zinc chloride and purified by recrystallization from alcohol. The essential product is a condensation product of two molecules of terpin hydrate with one of the di(aminobenzyl) derivatives of methylene-diguaiacol,—four molecules of water being lost in the process. It is a crystalline compound of the empirical formula $C_{49}H_{66}O_6N_2$, probably represented by the structural formula:

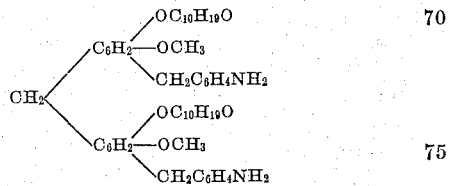

The fourth main step is the introduction of two acid radicals into the two amino groups of the above described condensation product. This may be accomplished by heating it with an organic acid, with the aid of a condensing agent when necessary. A method of preparing the diacetyl derivative is to heat 468 parts of the above described condensation product with 153 parts of aceticanhydride at 110° C. under a reflux condenser for 4 hours. The product is freed from acetic acid by washing with water. The essential product is the diacetyl-amino-benzyl derivative of the above described compound having the empirical formula $C_{53}H_{70}O_8N_2$ and probably the structural formula:

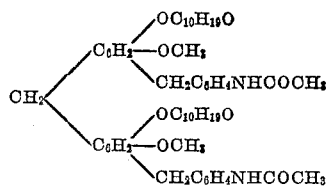

The fifth main step is the iodination of the above described acetylated (or acylated) condensation product. One way of doing this is to mix an alcohol solution of 570 parts of it with an alcohol solution of 254 parts of iodine. To the resulting solution is added an excess of mercury oxide, or of the oxide of another heavy metal; and the mixture is heated under a reflux condenser for 2 hours. When the reaction is over, the heavy metal is precipitated by the addition of ammonium sulphide, and the alcoholic solution is filtered and evaporated until the desired iodinated product crystallizes out. The product is crystalline and nearly white, insoluble in cold water but soluble in alcohol. The empirical formula of the iodination product from the diacetyl derivative is $C_{53}H_{68}I_2O_8N_2$. If radicals other than the acetyl $-OOCH_3$,—such as propionyl $-COC_2H_5$, and butyryl $-COC_3H_7$,—are introduced into the two amino groups in the fourth step above, the final products will have corresponding different empirical formulæ. Slightly different but isomeric final products are obtained according as the nitrobenzyl chloride used is ortho, meta, or para. The probable structural formula is:

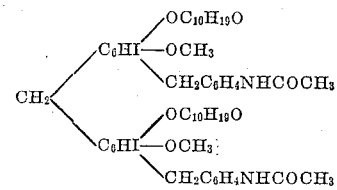

The products obtained are useful as systemic antiseptic, antineuralgic, antitubercular and anticatarrhal remedies. The dose for an adult may be 90 to 180 grains per day.

Having thus described my invention, I claim:

1. The herein described iodinated, acetylated condensation products of the di(aminobenzyl) derivatives of methylene-diguaiacol with terpin hydrate; insoluble in water but soluble in alcohol.

2. The herein described iodinated, acetylated condensation product of a di(ortho, meta or para aminobenzyl) derivative of methylene-diguaiacol with terpin hydrate; having the empirical formula $C_{53}H_{68}I_2O_8N_2$; insoluble in cold water but soluble in alcohol.

In testimony whereof, I have hereunto signed my name at Ambler, Pennsylvania, this 4th day of December, 1928.

SAMUEL LEWIS SUMMERS.